United States Patent
Kamps et al.

(10) Patent No.: US 7,816,444 B2
(45) Date of Patent: Oct. 19, 2010

(54) GLOSSY COLORED INJECTION MOLDED ARTICLE

(75) Inventors: Jan Henk Kamps, Bergen op Zoom (NL); Edward Kung, Bergen op Zoom (NL); Jan-Pleun Lens, Breda (NL); Michael Teruki Takemori, Rexford, NY (US); Hendrik Theodorus van de Grampel, Mijnsheerenland (NL)

(73) Assignee: Sabic Innovative Plastics IP B.V. (NL)

( * ) Notice: Subject to any disclaimer, the term of this patent is extended or adjusted under 35 U.S.C. 154(b) by 302 days.

(21) Appl. No.: 11/534,825

(22) Filed: Sep. 25, 2006

(65) Prior Publication Data

US 2008/0011513 A1    Jan. 17, 2008

Related U.S. Application Data

(60) Provisional application No. 60/807,134, filed on Jul. 12, 2006.

(51) Int. Cl.
  *C08G 64/16*   (2006.01)
  *C08G 8/00*    (2006.01)
  *C08G 64/04*   (2006.01)
  *C08G 64/38*   (2006.01)
  *C08L 69/00*   (2006.01)

(52) U.S. Cl. .......................... 524/611; 528/86; 528/125; 528/196; 528/204; 525/461; 525/462; 525/469

(58) Field of Classification Search ............ 524/611, 524/104; 528/196, 99, 198, 201, 86, 125, 528/204; 525/461, 462, 469
See application file for complete search history.

(56) References Cited

U.S. PATENT DOCUMENTS

| 3,650,584 | A | 3/1972 | Goetz et al. |
| 3,725,509 | A | 4/1973 | Kraft et al. |
| 5,455,310 | A * | 10/1995 | Hoover et al. ............... 525/431 |
| 6,001,953 | A | 12/1999 | Davis et al. |
| 6,376,641 | B2 * | 4/2002 | Nagai et al. ................. 528/198 |
| 6,417,256 | B1 | 7/2002 | Eckel et al. |
| 6,473,138 | B1 | 10/2002 | Fenner et al. |
| 6,759,458 | B2 * | 7/2004 | Reil ............................ 524/89 |
| 2003/0032725 | A1 | 2/2003 | Gaggar et al. |
| 2003/0060575 | A1 * | 3/2003 | Caruso et al. ............... 525/462 |
| 2003/0149223 | A1 * | 8/2003 | McCloskey et al. ......... 528/196 |
| 2003/0189838 | A1 * | 10/2003 | Schottland et al. .......... 362/509 |

(Continued)

FOREIGN PATENT DOCUMENTS

WO    0042102    7/2000

(Continued)

OTHER PUBLICATIONS

International Search Report for International Application No. PCT/US2007/071557, Mailed Jan. 22, 2008, 7 pages.

(Continued)

*Primary Examiner*—Mark Eashoo
*Assistant Examiner*—Michael Pepitone
(74) *Attorney, Agent, or Firm*—Cantor Colburn LLP

(57) ABSTRACT

An injection molded article comprising a polycarbonate composition. The polycarbonate composition is scratch resistant, flame retardant, has a low chlorine and bromine content and is dark colored.

29 Claims, 2 Drawing Sheets

U.S. PATENT DOCUMENTS

| | | | |
|---|---|---|---|
| 2004/0220330 A1* | 11/2004 | DeRudder et al. | 524/837 |
| 2004/0253428 A1* | 12/2004 | Wang et al. | 428/216 |
| 2005/0148719 A1* | 7/2005 | An et al. | 524/462 |
| 2005/0271879 A1 | 12/2005 | Miura et al. | |
| 2007/0009741 A1 | 1/2007 | Boven et al. | |
| 2008/0004404 A1 | 1/2008 | Van de Grampel et al. | |

FOREIGN PATENT DOCUMENTS

| | | |
|---|---|---|
| WO | 03099939 | 12/2003 |

OTHER PUBLICATIONS

Written Opinion for International Application No. PCT/US2007/071557, Mailed Jan. 2, 2008, 7 pages.

Japanese Patent Application No. JP2006273937, Published Oct. 12, 2006, Abstract Only, 1 page.

ISO 1133, "Plastics-Determination of the melt mass-flow rate (MFR) and the melt volume-flow rate (MVR) of thermoplastics", Jan. 15, 1997, 14 pages.

ISO 7724, "Paints and Varnishes-Colorimetry-Part 1: Principles", Oct. 1, 1984, 8 pages.

ISO 7724, "Paints and Varnishes-Colorimetry-Part 2: Colour measurement", Oct. 1, 1984, 10 pages.

ISO 7724, "Paints and Varnishes-Colorimetry-Part 3: Calculation of Colour differences", Oct. 15, 1984, 6 pages.

UL 94, "Tests for Flammability of Plastic Materials for Parts in Devices and Appliances", 59 pages.

\* cited by examiner

GLOSSY COLORED INJECTION MOLDED ARTICLE

CROSS REFERENCE TO RELATED APPLICATION

This application claims priority to U.S. Provisional Patent Application No. 60/807,134 filed on Jul. 12, 2006, which is incorporated herein in its entirety.

BACKGROUND OF THE INVENTION

This disclosure relates to injection molded articles, and in particular to large, colored, injection molded articles with a glossy finish.

Many injection molded parts are painted after injection molding. The painting step provides a glossy, scratch resistant paint layer that enhances the esthetics of the article through the glossy color and the utility by providing scratch resistance. There is an increasing desire to eliminate the painting step to improve efficiency of the manufacturing process, decrease costs, and decrease the environmental impact of the article and the process of creating the article. To eliminate the painting step it must be possible to produce a glossy colored article by injection molding. However, injection molding an article having a glossy color and scratch resistance with minimal or no after molding processing has proved difficult. In addition, many articles must meet flame retardant guidelines which increases the difficulty of producing an article with all of the desired characteristics.

There accordingly remains a need in the art for a glossy colored article having scratch resistance in the absence of a paint layer and flame retardant properties.

SUMMARY OF THE INVENTION

The above-described and other deficiencies of the art are met by an injection molded article comprising a polycarbonate composition
wherein the polycarbonate composition has
a UL94 rating of V0 at a thickness of 1.5 millimeters;
a melt viscosity rate (MVR) greater than or equal to 10 milliliters per 10 minutes when determined using ISO 1133 at 300° C. and 1.2 kilograms;
a chlorine content of less than or equal to 100 parts by weight per million parts by weight of the polycarbonate composition (ppm);
a bromine content of less than or equal to 100 ppm; and
wherein the article, as molded and free of any coating, has
a scratch depth at 8 Newtons force of less than or equal to 20 micrometers;
an L* value less than 45.00 as determined by ISO 7724.

The above described and other features are exemplified by the following detailed description.

DETAILED DESCRIPTION OF THE INVENTION

Figure 1:
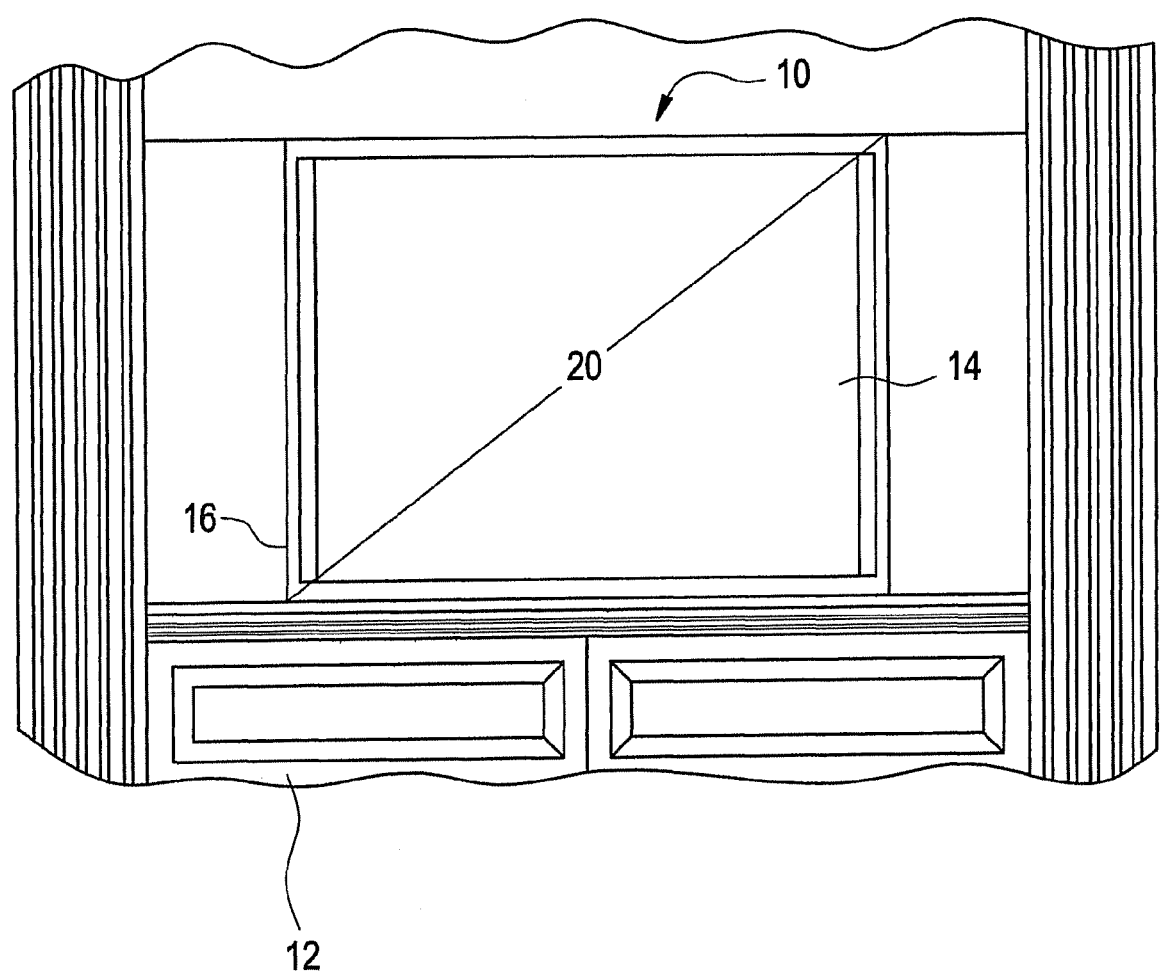
FIG. 1 is a representation of the front of a television.

The individual criteria of scratch resistance, flame retardance, low bromine and chlorine content, and melt volume rate may be met singly or in pairs but the combination of all of these criteria is surprisingly difficult to attain. When the composition must additionally meet a color criteria, the goal becomes significantly more difficult as the ultimate color and the esthetic quality of the article are affected by the polymer composition.

Scratch resistance is the ability of a material to resist surface damage when a stylus having a diamond tip with a radius of 400 micrometers is pressed against the surface of an article at a 90 degree angle with a force of 8 Newtons and moved across the surface of the article for a distance of 10 millimeters. The depth of the scratch left by the stylus is measured by a profilometer over a 0.5 millimeter distance in the mid third of the 10 millimeter scratch. The reported depth is the average depth over the 0.5 millimeter measurement range. Scratch resistance is an important characteristic for a finished article because it is a measure of the ability of the article's surface finish to withstand everyday use and wear. Articles described herein have a scratch depth less than or equal to 20 micrometers, or, more specifically, less than or equal to 15 micrometers, or, even more specifically, less than or equal to 10 micrometers when tested at 8 Newtons force in the absence of any coating. "Coating" as used herein refers to a layer applied to the article after molding, for example, paint, clear coat, electroplate, and the like. It does not include substances that might be found on the surface of the article that are an artifact of the article's production.

Flame retardance as used herein is determined according to Underwriter's Laboratory Bulletin 94 entitled "Tests for Flammability of Plastic Materials, UL94" (UL 94) at a thickness of 1.5 millimeters. UL 94 rates materials as V2, V1, or V0 depending on a fixed set of criteria. As a general rule, the flame retardance is more difficult to achieve at smaller thicknesses. Thus a V0 rating at 1.5 millimeters is more difficult to obtain than a V0 rating at 3.0 millimeters. Flame retardance in thermoplastic materials is typically achieved through the inclusion of flame retardant agents however, the amount and identity of the flame retardants can alter the visual characteristics of a thermoplastic. In many cases the inclusion of a flame retardant agent decreases the transparency, gloss, or transparency and gloss of the thermoplastic material.

Flame retardance is frequently attained using chlorinated or brominated flame retardants. Over the past few years it has been recognized that the presence of chlorine, bromine or both in a polymeric composition can be problematic. Accordingly a low bromine content, a low chlorine content or both is frequently required in many applications. Bromine and chlorine content can be determined by conventional analytical techniques such as atomic absorption. The bromine content is less than or equal to 100 parts by weight per million parts by weight of the polycarbonate composition (ppm). In some embodiments the bromine content is less than or equal to 50 ppm, or, more specifically, less than or equal to 20 ppm. The chlorine content is less than or equal to 100 parts by weight per million parts by weight of the polycarbonate composition (ppm). In some embodiments the chlorine content is less than or equal to 50 ppm of the polycarbonate composition, or, more specifically, less than or equal to 20 ppm of the polycarbonate composition.

Melt viscosity rate (MVR) is a measure of the polycarbonate composition's ability to flow when heated to a temperature at or above the melting temperature of the composition. A low MVR indicates a highly viscous material which is unsuitable for injection molding large articles and complex articles. The polycarbonate composition has an MVR greater than or equal to 10 milliliters per 10 minutes as determined by ISO 1133 at 300° C. and 1.2 kilograms (kg). Within this range the MVR can be greater than or equal to 11 milliliters per 10 minutes, or, more specifically, greater than or equal to 12 milliliters per 10 minutes. In some embodiments the MVR is less than or equal to 16 milliliters per 10 minutes.

Color can be characterized using several parameters such as L*, a* and b*. L* is an indicator of darkness of a color. A lower L* indicates a darker color. For example, a dark black would have an L* less than or equal to 30. The article made from the polycarbonate composition has an L* less than or equal to 45, or, more specifically, less than or equal to 40, or, even more specifically, less than or equal to 35.

In some embodiments the article has a DE* value less than or equal to 2.0, or, more specifically, less than or equal to 1.5, or, more specifically, less than or equal to 1.0 relative to an L* of 26.989, an a* value of 0.287, and a b* value of −0.771. The DE* describes the combined variance from the L*, a* and b* values. The color defined by an L* value of 26.989, an a* value of 0.287, b* value of −0.771, and a DE* value less than 1.0 is a deep black with a high gloss. The gloss is typically sufficiently high to be mirror like. This finish is known in the art as a "piano black" finish. It is desirable to achieve a piano black finish without bleeding and staining. L*, a*, b* and DE* are determined according to ISO 7724 as described in the examples.

The polycarbonate composition comprises a polycarbonate, a colorant, an optional flame retardant, an optional impact modifier, and an optional anti-drip agent. The polycarbonate composition may comprise a single polycarbonate or a mixture of polycarbonates. In some embodiments the polycarbonate composition consists essentially of a polycarbonate, a flame retardant, an anti-drip agent, optional additives, and a colorant. In some embodiments the composition consists essentially of a polycarbonate, an anti-drip agent, optional additives, and a colorant. In some embodiments the polycarbonate composition consists of a polycarbonate, a flame retardant, additives, and a colorant.

As used herein, the terms "polycarbonate" and "polycarbonate resin" mean polymers having repeating structural carbonate units of the formula (1):

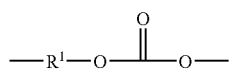
(1)

in which greater than or equal to 45 percent of the total number of $R^1$ groups are aromatic organic groups derived from a monomer of formula (2), a monomer of formula (3), a monomer of formula (4), or a combination comprising two or more of the foregoing. The balance of the $R^1$ groups are aliphatic groups, alicyclic groups, aromatic groups or a combination of the foregoing. "Polycarbonates" and "polycarbonate resins" as used herein include homopolycarbonates and copolymers comprising different $R^1$ moieties in the carbonate (referred to herein as "copolycarbonates").

Formula (2) is:

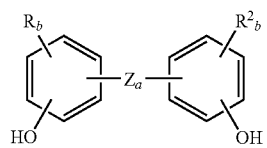
(2)

wherein R and $R^2$ are independently at each occurrence a $C_1$-$C_{12}$ alkyl group, b has a value of 1 to 4, a has a value of 0 or 1 and Z is selected from the group consisting of $C_5$-$C_{18}$ cycloalkyl groups attached to the phenyl rings at one or two carbons, $C_1$-$C_5$ alkyl groups, $C_6$-$C_{13}$ aryl groups, and $C_7$-$C_{12}$ alkylaryl groups.

Formula (3) is:

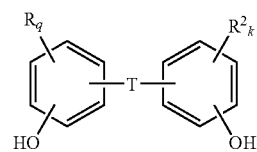
(3)

wherein R and $R^2$ are independently at each occurrence a $C_1$-$C_{12}$ alkyl, q and k independently have a value of 0 to 4 and T is selected from the group consisting of $C_5$-$C_{18}$ cycloalkyl groups attached to the phenyl rings at one or two carbons, $C_6$-$C_{12}$ aryl groups, and $C_7$-$C_{13}$ alkylaryl groups. At least one of R and $R^2$ are located ortho to the hydroxyl group.

Formula (4) is:

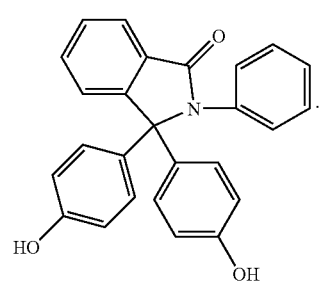
(4)

Specific examples of monomers of formula (2), or formula (3) include:

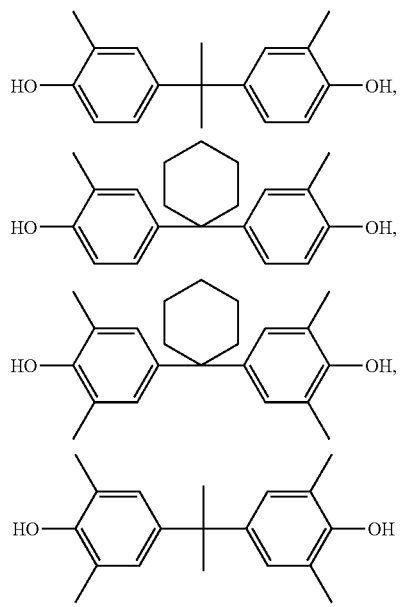

-continued

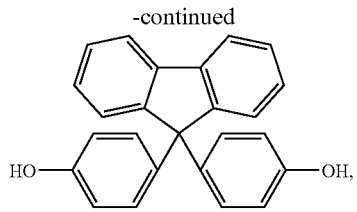

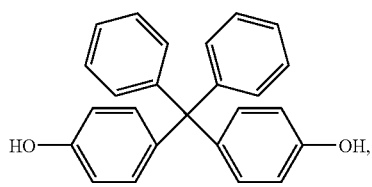

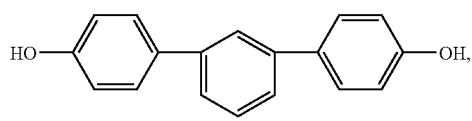

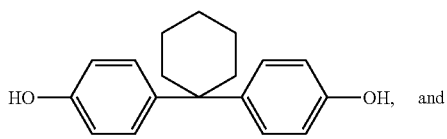

-continued

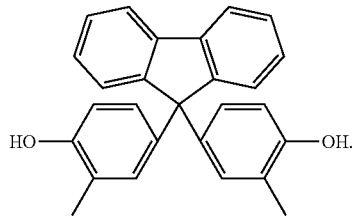

In some embodiments the polycarbonate is a copolycarbonate in which less than or equal to 55 percent of the total number of $R^1$ groups are derived from one or more of the following dihydroxy compounds: 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, and 1,1-bis(4-hydroxyphenyl)n-butane.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of about 10,000 to about 200,000, specifically about 20,000 to about 100,000 as measured by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 milliliters per minute (ml/min).

In some embodiments the polycarbonate comprises greater than or equal to 50 mole percent, or, more specifically, greater than or equal to 70 mole percent, or, even more specifically, greater than or equal to 90 mole percent of repeating units of formula (1).

In some embodiments the polycarbonate comprises ester units derived from terephthalate, isoterephthalate or a combination thereof. In one embodiment the ester units comprise repeating units of formula (5):

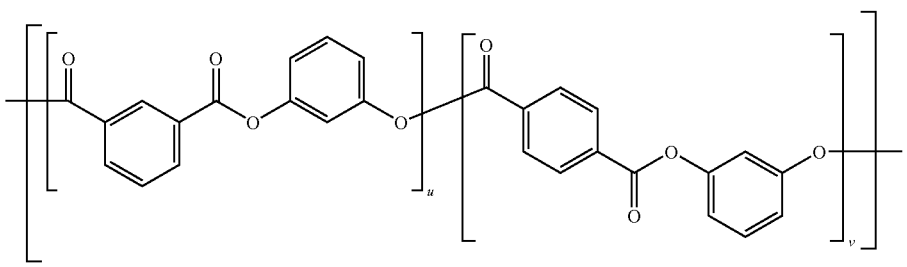

wherein the molar ratio of isophthalate units u to terephthalate units v is 91:9 to 2:98, more specifically 85:15 to 3:97.

Polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformate of a dihydric phenol (e.g., a compound of Formulas (2) through (5)) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt.% based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of about 0.05 to about 2.0 wt. %. Mixtures comprising linear polycarbonates and branched polycarbonates may be used.

A chain-stopper (also referred to as a capping agent) may be included during polymerization. The chain-stopper limits molecular weight growth rate, and so controls molecular weight in the polycarbonate. Exemplary chain-stoppers include certain mono-phenolic compounds, mono-carboxylic acid chlorides, and/or mono-chloroformates. Mono-phenolic chain-stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain-stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, useful transesterification catalysts for use in melt processes may include phase transfer catalysts of formula $(R^3)_4Q^+X$ above, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Colorants such as dye additives or a combination of pigment and dye additives are also present. Exemplary dyes include: Solvent Orange 60, Disperse Yellow 201, Solvent Violet 36, Solvent Blue 104, Solvent Yellow 163, Solvent Red 179, Solvent Red 52, Solvent Violet 13, Amaplast Yellow NX SY188, Solvent Yellow 33, Solvent Yellow 104, Solvent Blue 97, Disperse Orange 47, Solvent Green 28, Disperse Violet 26/31, Solvent Yellow 114, Solvent Blue 122, Macrolex Yellow E2R, Solvent Red 207, Solvent Red 135, Solvent Green 3, and Solvent Yellow 93. Exemplary combinations of dyes that may be used to achieve a color with an L* less than 45 include Solvent Violet 36, Solvent Green 3, and Solvent Yellow 93; Solvent Red 135, Solvent Green 3 and Solvent Yellow 93. Dyes can be used in an amount up to 2 weight percent based on the total weight of the polycarbonate composition. In some embodiments the composition is free of pigments.

The polycarbonate composition may optionally include an impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), and methyl methacrylate-butadiene-styrene (MBS).

Impact modifiers are generally present in amounts of 1 to 30 wt. %, based on the total weight of the polymers in the composition.

In some embodiments the polycarbonate composition is free of fillers. The term "fillers" as used herein refers to both fibrous and particulate fillers, for example, glass fibers, mica, talc, glass flake, glass spheres, nanofibers, clay, and carbon fibers.

In addition to the polycarbonate resin, the polycarbonate composition may include various additives ordinarily incorporated in resin compositions of this type, with the proviso that the additives are selected so as to not significantly adversely affect the desired properties of the polycarbonate composition. Combinations of additives may be used. Such additives may be mixed at a suitable time during the mixing of the components for forming the composition. Such additives include antioxidants, heat stabilizers, light stabilizers, ultraviolet light absorbing additives, plasticizers, lubricants, mold release agents, flame retardants, anti-drip agents, radiation stabilizers, and antistatic agents. The choice the additive or combination of additives as well as the amount of additive is well within the skill of one of ordinary skill in the art.

Exemplary antioxidant additives include, for example, organophosphites such as tris(nonyl phenyl)phosphite, tris(2, 4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers.

Light stabilizers and/or ultraviolet light (UV) absorbing additives may also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to about 100 nanometers; or the like, or combinations comprising at least one of the foregoing UV absorbers.

Plasticizers, lubricants, and/or mold release agents may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that may be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing may be used in a polymeric resin containing chemical antistatic agents to render the composition electrostatically dissipative.

Useful flame retardants include organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups may be joined together to provide a cyclic group, for example, diphenyl pentaerythritol diphosphate. Exemplary aromatic phosphates include, phenyl bis(dodecyl) phosphate, phenyl bis(neopentyl) phosphate, phenyl bis(3,5, 5'-trimethylhexyl)phosphate, ethyl diphenyl phosphate, 2-ethylhexyl di(p-tolyl)phosphate, bis(2-ethylhexyl) p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

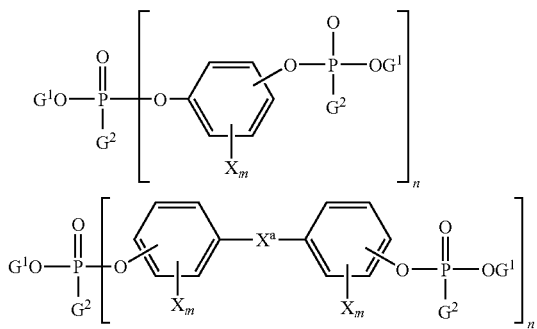

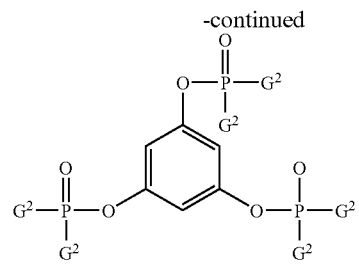

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol A respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide.

Inorganic flame retardants may also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like.

Another useful type of flame retardant is a polysiloxane-polycarbonate copolymer having polydiorganosiloxane blocks comprise repeating structural units of formula (21):

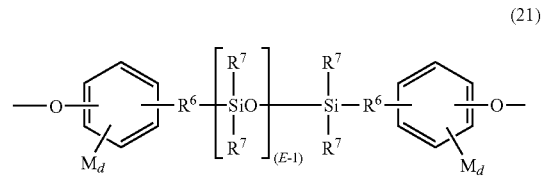

wherein each occurrence of $R^7$ is same or different, and is a $C_{1-13}$ monovalent organic group. For example, $R^7$ may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. Combinations of the foregoing $R^7$ groups may be used in the same copolymer. $R^6$ in formula (21) is a divalent $C_1$-$C_8$ aliphatic group. Each M in formula (21) may, be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each d is independently 0, 1, 2, 3, or 4.

E in formula (21) is selected so as to provide an effective level of flame retardance to the polycarbonate composition. The value of E will therefore vary depending on the type and relative amount of each component in the polycarbonate composition, including the type and amount of polycarbonate, impact modifier, polysiloxane-polycarbonate copolymer, and other flame retardants. Suitable values for E may be determined by one of ordinary skill in the art without undue experimentation using the guidelines taught herein. Generally, E has an average value of 2 to about 1,000, specifically about 10 to about 100, more specifically about 25 to about 75. In one embodiment, E has an average value of about 40 to about 60, and in still another embodiment, E has an average value of about 50. Where E is of a lower value, e.g., less than about 40, it may be necessary to use a relatively larger amount of the polysiloxane-polycarbonate copolymer. Conversely, where E is of a higher value, e.g., greater than or equal to about 40, it may be necessary to use a relatively smaller amount of the polysiloxane-polycarbonate copolymer.

In one embodiment, M is independently a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^6$ is a dimethylene, trimethylene or tetramethylene group; and $R^7$ is a $C_{1-8}$ alkyl, haloalkyl such as trifluoropropyl, cyanoalkyl, or aryl such as phenyl, chlorophenyl or tolyl. In another embodiment, $R^7$ is methyl, or a combination of methyl and trifluoropropyl, or a combination of methyl and phenyl. In still another embodiment, M is methoxy, n is one, $R^6$ is a divalent $C_1$-$C_3$ aliphatic group, and $R^7$ is methyl.

The polysiloxane-polycarbonate copolymer may be manufactured by reaction of the corresponding dihydroxy polysiloxane with a carbonate source and a dihydroxy aromatic compound, optionally in the presence of a phase transfer catalyst as described above. Conditions are similar to those useful in forming polycarbonates. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising about 1 to about 60 mole percent of polydiorganosiloxane blocks relative to the moles of polycarbonate blocks, and more generally, about 3 to about 50 mole percent of polydiorganosiloxane blocks relative to the moles of polycarbonate blocks. When present, the copolymers may be used in amounts of about 1 to about 50 parts by weight, more specifically about 10 to about 40 parts by weight, based on 100 parts by weight of polycarbonate resin and the optional impact modifier.

Anti-drip agents may also be used in the composition, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. An exemplary TSAN may comprise about 50 wt % PTFE and about 50 wt % SAN, based on the total weight of the encapsulated fluoropolymer. The SAN may comprise, for example, about 75 wt % styrene and about 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

Radiation stabilizers may also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexanediol, and the like; cycloalkylene polyols such as 1,2-cyclopentanediol, 1,2-cyclohexanediol, and the like; branched alkylenepolyols such as 2,3-dimethyl-2,3-butanediol(pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol(hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon may be a methylol group (—$CH_2OH$) or it may be a member of a more complex hydrocarbon group such as —$CR^4HOH$ or —$CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization.

The polycarbonate compositions may be manufactured by various methods. For example, powdered polycarbonate resin, optional impact modifier, colorant, and/or other optional components are first blended, in a HENSCHEL-Mixer® high speed mixer. Other low shear processes, including but not limited to hand mixing, may also accomplish this blending. The blend is then fed into the throat of a twin-screw extruder via a hopper. Alternatively, at least one of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In one embodiment the polycarbonate composition comprises a transparent polycarbonate. Without being bound by theory it is postulated that use of a transparent polycarbonate may enhance the aesthetic color quality of the article. Transparent compositions may be produced by manipulation of the process used to manufacture the polycarbonate composition. One example of such a process to produce transparent polycarbonate compositions is described in U.S. Patent Application No. 2003/0032725.

The article comprising the polycarbonate composition is formed by injection molding. In one embodiment, the article comprises a display (or screen) bezel such as those used to frame display screens for computers, televisions and other viewing apparatuses. FIG. 1 shows an exemplary television, 10, comprising a screen, 14, surrounded by a bezel, 16. The television, 10, is set in a cabinet, 12.

Figure 2:
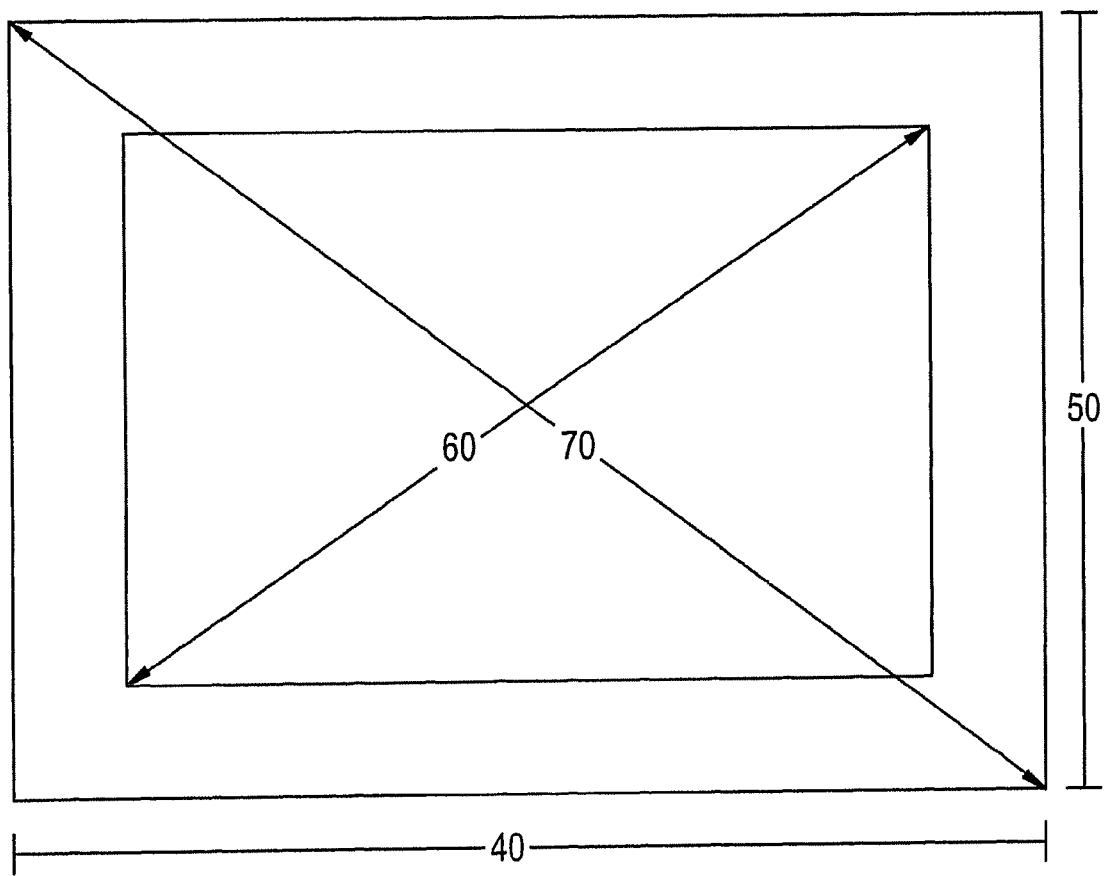
FIG. 2 shows the relative location of several dimensions of a bezel.

FIG. 2 shows the location of various bezel dimensions as used herein. In particular FIG. 2 shows the width, 40, the height, 50, the inner diagonal length, 60, and the outer diagonal length, 70.

In one embodiment the bezel has a width of 30 to 100 centimeters (cm), a height of 20 to 90 cm, an inner diagonal length of 3 to 120 cm, and an outer diagonal length of 5 to 150 cm. The bezel thickness, in some embodiments is 1.0 millimeter (mm) to 5 mm. The bezel weight may be 1 gram (g) to 1000 g.

One embodiment is a bezel comprising a polycarbonate composition, wherein the polycarbonate composition is free of filler and has a UL94 rating of V0 at a thickness of 1.5 millimeters;

a melt viscosity rate of 10 to 16 millimeters per 10 minutes when determined according to ISO 1133 at 300° C. and 1.2 kilograms;

a chlorine content less than or equal to 100 ppm; and a bromine content less than or equal to 100 ppm;

wherein the article, as molded and free of any coating, has a scratch depth of 8 Newtons force of less than or equal to 20 micrometers; and a DE* value less than 1.0 relative to an L* value of 26.989, an a* value of 0.287, and a b* value of −0.771, when determined according to ISO 7724.

The polycarbonate composition and article thereof is further illustrated by the following non-limiting examples.

EXAMPLES

Examples 1-11

These examples demonstrate the scratch resistance of various polycarbonate homopolymers, polycarbonate copolymers and other thermoplastics when injection molded. Scratch resistance was determined as described above with an 8 Newton force on an injection molded article having the polycarbonate composition shown in Table 1. Results are shown in Table 1. The structure of the monomer or combination of monomers used in the preparation of the polycarbonate homopolymer (PC) or polycarbonate copolymer (coPC) is shown in Table 1. All polycarbonate copolymers employed a 1:1 molar ratio of monomers.

TABLE 1

| Ex. | Monomer 1 | Monomer 2 | Scratch depth (micrometer) |
| --- | --- | --- | --- |
| 1 | PC | | 1.0 |
| 2 | PC | | 4.3 |
| 3 | PC | | 6.9 |
| 4 | PC | | 11.0 |
| 5 | PC | | 8.0 |

TABLE 1-continued

| Ex. | Monomer 1 | Monomer 2 | Scratch depth (micrometer) |
|---|---|---|---|
| 6 | PC; 1,1-bis(4-hydroxyphenyl)cyclohexane | | 9.0 |
| 7 | coPC; 9,9-bis(3-methyl-4-hydroxyphenyl)fluorene | bisphenol A | 4.7 |
| 8 | coPC; 1,1-bis(3-methyl-4-hydroxyphenyl)cyclohexane | bisphenol A | 10.4 |
| 9 | coPC; 9,9-bis(4-hydroxyphenyl)fluorene | bisphenol A | 14.6 |
| 10* | PC; 2,2-bis(4-hydroxyphenyl)hexafluoropropane | | 26.1 |
| 11* | PC; bisphenol A | | 29.4 |

*Comparative examples

Examples 12-15

Examples having the compositions shown in Table 2 were tested for MVR as described above. Results are shown in Table 2.

TABLE 2

| Example | Material | MVR (milliliters per 10 minutes) |
|---|---|---|
| 12 | Composition according to Ex. 8 | 14 |
| 13 | A blend of example 8 and an ABS rubber | 27 |
| 14 | Blend of a bisphenol A polycarbonate and an ABS. | 27 |
| 15 | Blend of a bisphenol A polycarbonate and an ABS. | 40 |

Examples 16-24

Examples having the compositions shown in Table 3 were characterized for color according to ISO 7724 using a Gretag-Macbeth Color Eye 7000A or equivalent spectrophotometer run in reflectance mode with specular component included. The observer angle was 2 degrees. Each was tested using three illuminants that simulate International Commission On Illumination (CIE) standards: $D_{65}$, Cool White Fluorescent (CWF-2), and Daylight (C). Results are shown in Table 4. The examples contained 0.4 to 0.5 weight percent of standard additives, based on the total weight of the composition. All amounts in Table 3 are in weight percent based on the total weight of the composition.

TABLE 3

|  | 16 | 17 | 18 | 19 | 20 | 21 | 22 | 23 | 24 |
|---|---|---|---|---|---|---|---|---|---|
| Polycarbonate of Ex. 8 | 99.34 | 97.62 | 70.06 | 69.56 | 66.46 | 65.96 | 70.06 | 69.56 | 68.06 |
| Endcapped polycarbonate/polysiloxane copolymer | — | — | 14 | 14 | 16.8 | 16.8 | — | — | 14 |
| Transparent polycarbonate/polysiloxane copolymer | — | — | — | — | — | — | 14 | 14 | — |
| ABS impact modifier | — | — | 3 | 3 | 3.6 | 3.6 | 3 | 3 | 3 |
| Organic phosphate flame retardant | — | — | 10 | 10 | 10 | 10 | 10 | 10 | 10 |
| Anti-drip agent | — | — | 1 | 1 | 1.2 | 1.2 | 1 | 1 | 1 |
| Carbon black pigment | — | 0.5 | 0.5 | 0.5 | 0.5 | 0.5 | 0.5 | 0.5 | 0.5 |
| Cerium sulfide red pigment | — | 0.25 | 0.25 | 0.25 | 0.25 | 0.25 | 0.25 | 0.25 | 0.25 |
| Cobalt titanate green pigment | — | 0.6 | 0.6 | 0.6 | 0.6 | 0.6 | 0.6 | 0.6 | 0.6 |
| Copper phthalocyanine blue pigment | — | 0.13 | 0.13 | 0.13 | 0.13 | 0.13 | 0.13 | 0.13 | 0.13 |
| Solvent Red 135 | 0.13 | 0.25 | — | 0.25 | — | 0.25 | — | 0.25 | 1 |
| Solvent Green 3 | 0.13 | 0.25 | — | 0.25 | — | 0.25 | — | 0.25 | 1 |

TABLE 4

|  | L* | a* | b* | DL* | Da* | Db* | DE* |
|---|---|---|---|---|---|---|---|
| 16 | 26.986 | 0.312 | −0.779 | −0.003 | 0.026 | −0.008 | 0.027 |
|  | 26.995 | 0.273 | −0.78 | 0.006 | −0.014 | −0.01 | 0.018 |
|  | 26.987 | 0.275 | −0.752 | −0.003 | −0.011 | 0.018 | 0.022 |
| 17 | 28.183 | 0.252 | −1.11 | 1.193 | −0.035 | −0.339 | 1.241 |
|  | 28.187 | 0.234 | −1.142 | 1.198 | −0.053 | −0.371 | 1.256 |
|  | 28.182 | 0.247 | −1.115 | 1.193 | −0.04 | −0.344 | 1.242 |
| 18 | 29.105 | 0.057 | −1.551 | 2.116 | −0.23 | −0.78 | 2.267 |
|  | 29.078 | 0.086 | −1.575 | 2.089 | −0.2 | −0.805 | 2.248 |
|  | 29.099 | 0.075 | −1.538 | 2.11 | −0.212 | −0.767 | 2.255 |
| 19 | 28.759 | 0.132 | −1.559 | 1.77 | −0.155 | −0.789 | 1.944 |
|  | 28.766 | 0.107 | −1.551 | 1.777 | −0.18 | −0.78 | 1.949 |
|  | 28.734 | 0.137 | −1.583 | 1.745 | −0.15 | −0.812 | 1.931 |
| 20 | 29.148 | 0.044 | −1.634 | 2.159 | −0.242 | −0.864 | 2.338 |
|  | 29.173 | 0.046 | −1.637 | 2.184 | −0.241 | −0.866 | 2.362 |
|  | 29.16 | 0.048 | −1.651 | 2.171 | −0238 | −0.88 | 2.355 |
| 21 | 28.821 | 0.132 | −1.674 | 1.832 | −0.155 | −0.903 | 2.049 |
|  | 28.794 | 0.135 | −1.674 | 1.805 | −0.152 | −0.903 | 2.024 |
|  | 28.812 | 0.104 | −1.663 | 1.823 | −0.182 | −0.892 | 2.038 |
| 22 | 28.656 | 0.136 | −1.071 | 1.667 | −0.151 | −0.301 | 1.7 |
|  | 28.666 | 0.128 | −1.085 | 1.677 | −0.159 | −0.314 | 1.713 |
|  | 28.654 | 0.107 | −1.058 | 1.665 | −0.18 | −0.287 | 1.699 |
| 23 | 28.434 | 0.16 | −1.088 | 1.445 | −0.127 | −0.317 | 1.485 |
|  | 28.365 | 0.176 | −1.082 | 1.376 | −0.111 | −0.312 | 1.415 |
|  | 28.412 | 0.169 | −1.082 | 1.423 | −0.118 | −0.311 | 1.461 |
| 24 | 28.103 | 0.172 | −1.55 | 1.114 | −0.115 | −0.779 | 1.364 |
|  | 28.124 | 0.165 | −1.561 | 1.135 | −0.122 | −0.791 | 1.389 |
|  | 28.133 | 0.161 | −1.545 | 1.144 | −0.126 | −0.774 | 1.387 |

DL*, Da*, and Db* are given by the equations:
DL* = (L* − 26.989)
Da* = (a* − 0.287)
Db* = (b* − (−0.771))
DE* is given by the equation:
DE* = (DL*$^2$ + Da*$^2$ + Db*$^2$)$^{1/2}$ As can be seen from the data in Table 4 it is very difficult to achieve a polycarbonate composition with a piano black color. Relatively small variations can have a significant impact on the DE* value. All examples except for Example 16 show a DE*>1 indicating a detectable color difference from piano black (L* of 26.989, an a* value of 0.287, b* value of −0.771). The DE* describes the maximum combined variance from the L*, a* and b* values that can be tolerated while maintaining color integrity.

Examples 25-34

The following components were used: The copolymer of Example 8 having a weight average molecular weight of about 23,500 (measured against polycarbonate standards), the polymer of Example 11 having a weight average molecular weight of about 23,300 (measured against polycarbonate standards), potassium perfluorobutane sulfonate (also known as $C_4$ K Rimar Salt or KPFBS), and TSAN which is polytetrafluoroethylene encapsulated in a styrene/acrylonitrile copolymer (50 wt. % PTFE, 50 wt. % SAN). Compositions are shown in Table 5 and amounts are in weight percent based on the total weight of the copolymer of Example 8 or the polymer of Example 11. The compositions were tested for flammability (flame retardancy) as described in the following paragraph. Results are shown in Table 6.

Flammability tests were performed following the procedure of Underwriter's Laboratory Bulletin 94 entitled "Tests for Flammability of Plastic Materials, UL94." According to this procedure, materials may be classified as HB, V0, V1, V2, 5VA, and/or 5VB on the basis of the test results obtained for five samples at 1.5 millimeter sample thickness. The samples are made according to the UL94 test procedure using standard ASTM molding criteria. The criteria for each of the flammability classifications tested are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton, and no specimen burns up to the holding clamp after flame or after glow. Five bar flame out time (FOT) is the sum of the flame out time for five bars, each lit twice for ten (10) seconds each, for a maximum flame out time of 50 seconds. FOT1 is the average flame out time after the first light. FOT2 is the average flame out time after the second light.

V1, V2, FOT: In a sample placed so that its long axis is 180 degrees to the flame, the average period of flaming and/or smoldering after removing the igniting flame does not exceed twenty-five seconds and, for a V1 rating, none of the vertically placed samples produces drips of burning particles that ignite absorbent cotton. The V2 standard is the same as V1, except that drips are permitted. Five bar flame out time (FOT) is the sum of the flame out time for five bars, each lit twice for ten (10) seconds each, for a maximum flame out time of 250 seconds.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$pFTP = (P_{t1>mbt,n=0} \times P_{t2>mbt,n=0} \times P_{total<=mtbt} \times P_{drip,n=0})$$

where $P_{t1>mbt,n=0}$ is the probability that no first burn time exceeds a maximum burn time value, $P_{t2>mbt,n=0}$ is the probability that no second burn time exceeds a maximum burn time value, $P_{total<=mtbt}$ is the probability that the sum of the burn times is less than or equal to a maximum total burn time value, and $P_{drip,n=0}$ is the probability that no specimen exhibits dripping during the flame test. First and second burn time refer to burn times after a first and second application of the flame, respectively.

The probability that no first burn time exceeds a maximum burn time value, $P_{t1>mbt,n=0}$, may be determined from the formula:

$$P_{t1>mbt,n=0} = (1-P_{t1>mbt})^5$$

where $P_{t1>mbt}$ is the area under the log normal distribution curve for t1>mbt, and where the exponent "5" relates to the number of bars tested.

The probability that no second burn time exceeds a maximum burn time value may be determined from the formula:

$$P_{t2>mbt,n=0} = (1-P_{t2>mbt})$$

where $P_{t2>mbt}$ is the area under the normal distribution curve for t2>mbt. As above, the mean and standard deviation of the burn time data set are used to calculate the normal distribution curve. For the UL-94 V0 rating, the maximum burn time is 10 seconds. For a V1 or V2 rating the maximum burn time is 30 seconds.

The probability $P_{drip,n=0}$ that no specimen exhibits dripping during the flame test is an attribute function, estimated by:

$$(1-P_{drip})^5$$

where $P_{drip}$ = (the number of bars that drip/the number of bars tested).

The probability $P_{total<=mtbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V1 or V2 rating, the maximum total burn time is 250 seconds.

Preferably, p(FTP) is as close to 1 as possible, for example, greater than or equal to about 0.7, optionally greater than or equal to about 0.85, optionally greater than or equal to about 0.9 or, more specifically, greater than or equal to about 0.95, for maximum flame-retardant performance in UL testing. The p(FTP)$\geq$0.7, and specifically, p(FTP)$\geq$0.85, is a more stringent standard than merely specifying compliance with the referenced V0 or V1 test.

TABLE 5

| COMPONENTS | 25 | 26 | 27 | 28 | 29 | 30* | 31* | 32* | 33* | 34* |
|---|---|---|---|---|---|---|---|---|---|---|
| Copolymer of Ex. 8 | 100 | 100 | 100 | 100 | 100 | 0 | 0 | 0 | 0 | 0 |
| Polymer of Ex. 11 | 0 | 0 | 0 | 0 | 0 | 100 | 100 | 100 | 100 | 100 |
| KPFBS | 0.08 | 0.08 | 0.12 | 0.12 | 0.10 | 0.08 | 0.08 | 0.12 | 0.12 | 0.10 |
| TSAN | 0.4 | 0.2 | 0.4 | 0.2 | 0.3 | 0.5 | 0.4 | 0.4 | 0.2 | 0.3 |
| Others** | 0.32 | 0.32 | 0.32 | 0.32 | 0.32 | 0.32 | 0.32 | 0.32 | 0.32 | 0.32 |

*Comparative Example

**An additive package comprising 0.05 wt. % antioxidant (Irgaphos ™ 168) and 0.27 wt % mold release agent (based on 100% by weight of the total composition) was also added to all samples.

TABLE 6

| PHYSICAL PROPERTIES | 25 | 26 | 27 | 28 | 29 | 30* | 31* | 32* | 33* | 34* |
|---|---|---|---|---|---|---|---|---|---|---|
| p(FTP) at 1.5 mm | — | 0.857 | 0 | 0.983 | 0.03 | 0.984 | 0.998 | 0.489 | 0 | 0.131 | 0.1 |
| FOT1 at 1.5 mm** | sec 0 | 9 in 10 | 0 | 4 in 10 | 0 | 0 | 1 in 10 | 6 in 10 | 1 in 10 | 3 in 10 |

*Comparative example

**When listed as 5 in 10, it means that 5 of the 10 bars dripped, 2 in 10 means that 2 of the 10 bars dripped, etc.

As can be seen by the data in Table 6, compositions containing the copolymer of Example 8 can achieve robust flame retardance with minimal amounts of flame retardant and anti-drip agent.

Example 35

Example 35, having the composition shown in Table 7, was characterized for color and tested for flammability and MVR as described above. Results are shown in Table 7. Amounts in Table 7 are in weight percent based on the total weight of the composition.

TABLE 7

|  | 35 |
| --- | --- |
| Polycarbonate of Example 8 | 98.90 |
| Rimar Salt | 0.12 |
| TSAN | 0.40 |
| Others** | 0.32 |
| Solvent Red 135 | 0.13 |
| Solvent Green 3 | 0.13 |
| Total | 100 |
| MVR | 12.7 |
| P(FTP) at 1.5 mm | 1.000 |
| FOT at 1.5 mm | 0 |
| L* | 26.83 |
| a* | 0.27 |
| b* | −0.66 |
| dE | 0.57 |

**An additive package comprising 0.05 wt % antioxidant (Irgaphos ™ 168) and 0.27 wt % mold release agent.

Example 35 demonstrates a composition having good melt viscosity, flame retardance, and color.

The singular forms "a," "an," and "the" include plural referents unless the context clearly dictates otherwise.

"Optional" or "optionally" means that the subsequently described event or circumstance may or may not occur, and that the description includes instances where the event occurs and instances where it does not.

Compounds are described using standard nomenclature. For example, any position not substituted by any indicated group is understood to have its valency filled by a bond as indicated, or a hydrogen atom.

As used herein, the term "alkyl" refers to a straight or branched chain monovalent hydrocarbon group; "cycloalkyl" refers to a non-aromatic monovalent monocyclic or multi-cylic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

Exemplary groups that may be present on a "substituted" position include, but are not limited to, halogen; cyano; hydroxyl; nitro; azido; alkanoyl (such as a $C_2$-$C_6$ alkanoyl group such as acyl or the like); carboxamido; alkyl groups (typically having 1 to about 8 carbon atoms, or 1 to about 6 carbon atoms); cycloalkyl groups, alkenyl and alkynyl groups (including groups having at least one unsaturated linkages and from 2 to about 8, or 2 to about 6 carbon atoms); alkoxy groups having at least one oxygen linkages and from 1 to about 8, or from 1 to about 6 carbon atoms; aryloxy such as phenoxy; alkylthio groups including those having at least one thioether linkages and from 1 to about 8 carbon atoms, or from 1 to about 6 carbon atoms; alkylsulfinyl groups including those having at least one sulfinyl linkages and from 1 to about 8 carbon atoms, or from 1 to about 6 carbon atoms; alkylsulfonyl groups including those having at least one sulfonyl linkages and from 1 to about 8 carbon atoms, or from 1 to about 6 carbon atoms; aminoalkyl groups including groups having at least one N atom and from 1 to about 8, or from 1 to about 6 carbon atoms; aryl having 6 or more carbons and at least one rings, (e.g., phenyl, biphenyl, naphthyl, or the like, each ring either substituted or unsubstituted aromatic); arylalkyl having 1 to 3 separate or fused rings and from 6 to about 18 ring carbon atoms, with benzyl being an exemplary arylalkyl group; or arylalkoxy having 1 to 3 separate or fused rings and from 6 to about 18 ring carbon atoms, with benzyloxy being an exemplary arylalkoxy group.

All references are incorporated herein by reference.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. An injection molded article comprising a polycarbonate composition
    wherein the polycarbonate composition comprises a colorant and has
        a UL94 rating of V0 at a thickness of 1.5 millimeters;
        a melt viscosity rate (MVR) greater than or equal to 10 milliliters per 10 minutes when determined using ISO 1133 at 300° C. and 1.2 kilograms;
        a chlorine content of less than or equal to 100 parts by weight per million parts by weight of the polycarbonate composition; and
        a bromine content of less than or equal to 100 parts by weight per million parts by weight of the polycarbonate composition; and
    wherein the article, as molded and free of any coating, has
        a scratch depth at 8 Newtons force of less than or equal to 20 micrometers; and
        wherein the article has a DE* value less than or equal to 2.0 relative to an L* value of 26.989, an a* value of 0.287 and a b* value of −0.771 as determined by ISO 7724.

2. The article of claim 1 wherein the polycarbonate composition comprises a polycarbonate having repeating structural carbonate units of formula (1)

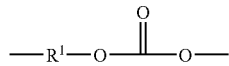
(1)

in which greater than or equal to 45 percent of the total number of $R^1$ groups are aromatic organic groups derived from a monomer of formula (2), a monomer of formula (3), a monomer of formula (4), or a combination comprising two or more of the foregoing, wherein formula (2) is:

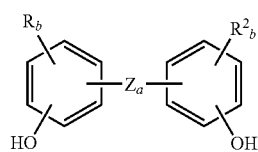
(2)

wherein R and $R^2$ are independently at each occurrence a $C_1$-$C_{12}$ alkyl group, b has a value of 1 to 4, a has a value of 0 or 1 and Z is selected from the group consisting of $C_5$-$C_{18}$ cycloalkyl groups attached to the phenyl rings at one or two carbons, $C_1$-$C_5$ alkyl groups, $C_6$-$C_{13}$ aryl groups, and $C_7$-$C_{12}$ alkylaryl groups, wherein formula (3) is:

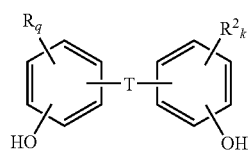
(3)

wherein R and $R^2$ are independently at each occurrence a $C_1$-$C_{12}$ alkyl, q and k independently have a value of 0 to 4 and T is selected from the group consisting of $C_5$-$C_{18}$ cycloalkyl groups attached to the phenyl rings at one or two carbons, $C_6$-$C_{12}$ aryl groups, and $C_7$-$C_{13}$ alkylaryl groups, at least one of R and $R^2$ are located ortho to a hydroxyl group, and wherein formula (4) is:

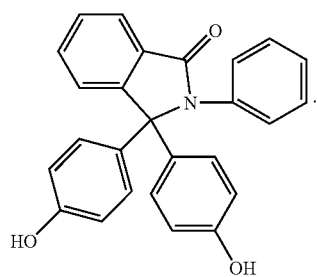
(4)

3. The article of claim 2, wherein greater than or equal to 45 percent of the total number of $R^1$ groups are aromatic organic groups derived from one or more of the following monomers:

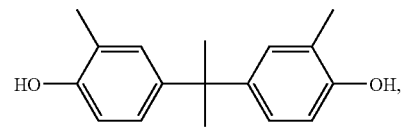
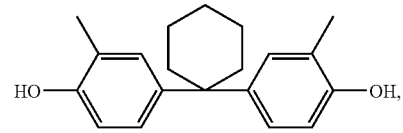
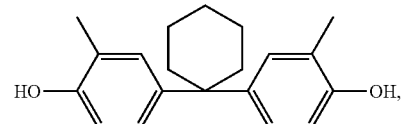
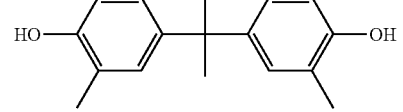
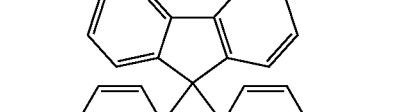
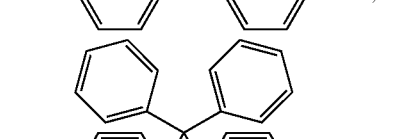
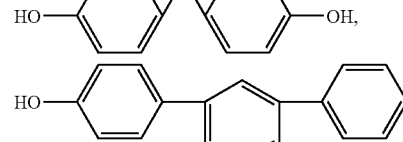
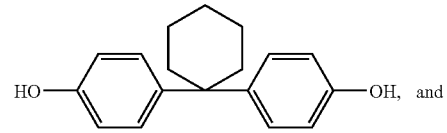
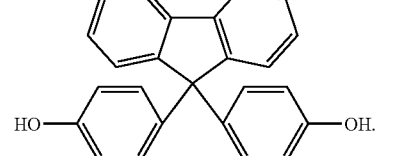

4. The article of claim 2, wherein the polycarbonate is a copolycarbonate in which less than or equal to 55 percent of the total number of $R^1$ groups are derived from one or more of the following dihydroxy compounds: 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl) butane, 2,2-bis(4-hydroxyphenyl) octane, 1,1-bis(4-hydroxyphenyl)propane, and 1,1-bis(4-hydroxyphenyl)n-butane.

5. The article of claim 2, wherein the polymer further comprises repeating units of formula (5):

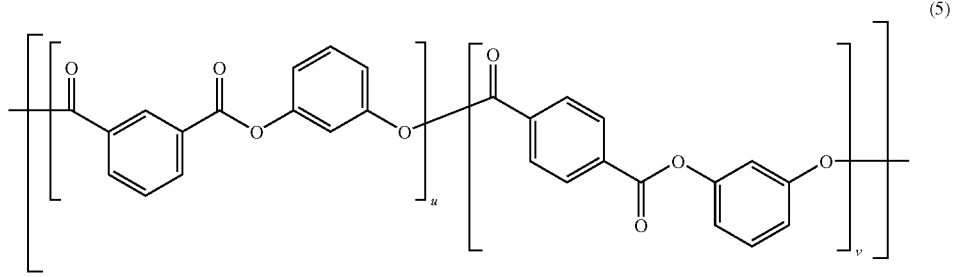

wherein the molar ratio of isophthalate units u to terephthalate units v is 91:9 to 2:98.

6. The article of claim 1, wherein the scratch depth is less than or equal to 15 micrometers.

7. The article of claim 1, wherein the scratch depth is less than or equal to 10 micrometers.

8. The article of claim 1, wherein the chlorine content is less than or equal to 50 parts by weight per million parts by weight of the polycarbonate composition.

9. The article of claim 8, wherein the chlorine content is less than or equal to 20 parts by weight per million parts by weight of the polycarbonate composition.

10. The article of claim 1, wherein the bromine content is less than or equal to 50 parts by weight per million parts by weight of the polycarbonate composition.

11. The article of claim 10, wherein the bromine content is less than or equal to 20 parts by weight per million parts by weight of the polycarbonate composition.

12. The article of claim 1, wherein the DE* value is less than or equal to 1.5.

13. The article of claim 1, wherein the DE* value is less than or equal to 1.0.

14. The article of claim 1, wherein the article is a bezel.

15. The article of claim 14, wherein the bezel has a width of 30 to 100 centimeters, a height of 20 to 90 centimeters, an inner diagonal length of 3 to 120 centimeters, and an outer diagonal length of 5 to 150 centimeters.

16. The article of claim 14, wherein the bezel has a thickness of 1.0 to 5.0 millimeters.

17. The article of claim 14, wherein the bezel has a weight of 1 to 1000 grams.

18. The article of claim 1, wherein the polycarbonate composition is free of fillers.

19. A bezel comprising
a polycarbonate composition,
wherein the polycarbonate composition has
a UL94 rating of V0 at a thickness of 1.5 millimeters;
a melt viscosity rate of 10 to 16 millimeters per 10 minutes when determined according to ISO 1133 at 300° C. and 1.2 kilograms
a chlorine content less than or equal to 100 ppm
a bromine content less than or equal to 100 ppm
wherein the polycarbonate composition is free of any filler,
wherein the bezel, as molded and free of any coating, has
a scratch depth of 8 Newtons force of less than or equal to 20 micrometers; and
a DE* value less than or equal to 1.0 relative to an L* value of 26.989, an a* value of 0.287, and a b* value of −0.771 as determined according to ISO 7724.

20. The bezel of claim 19, wherein the polycarbonate composition comprises a polycarbonate, a flame retardant, and a colorant.

21. The bezel of claim 19, wherein the polycarbonate composition comprises a polycarbonate, an anti-drip agent, and a colorant.

22. The bezel of claim 21, wherein the polycarbonate composition further comprises a flame retardant.

23. The bezel of claim 19, wherein the bezel has a width of 30 to 100 centimeters, a height of 20 to 90 centimeters, an inner diagonal length of 3 to 120 centimeters, and an outer diagonal length of 5 to 150 centimeters.

24. The bezel of claim 19, wherein the bezel has a thickness of 1.0 to 5.0 millimeters.

25. The bezel of claim 19, wherein the bezel has a weight of 1 to 1000 grams.

26. An injection molded article comprising a polycarbonate composition
wherein the polycarbonate composition comprises a colorant and a polycarbonate of formula (1)

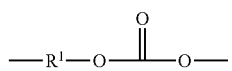

in which greater than or equal to 45 percent of the total number of $R^1$ groups are aromatic organic groups derived from a monomer of formula (2), a monomer of formula (3), a monomer of formula (4), or a combination comprising two or more of the foregoing,
wherein formula (2) is:

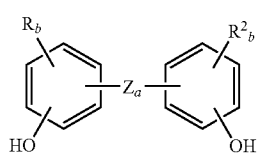

wherein R and $R^2$ are independently at each occurrence a $C_1$-$C_{12}$ alkyl group, b has a value of 1 to 4, a has a value of 0 or 1 and Z is selected from the group consisting of $C_5$-$C_{18}$ cycloalkyl groups attached to the phenyl rings at one or two carbons, $C_1$-$C_5$ alkyl groups, $C_6$-$C_{13}$ aryl groups, and $C_7$-$C_{12}$ alkylaryl groups, wherein formula (3) is:

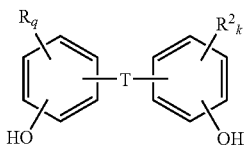
(3)

wherein R and R² are independently at each occurrence a C₁-C₁₂ alkyl, q and k independently have a value of 0 to 4 and T is selected from the group consisting of C₅-C₁₈ cycloalkyl groups attached to the phenyl rings at one or two carbons, C₆-C₁₂ aryl groups, and C₇-C₁₃ alkylaryl groups, at least one of R and R² are located ortho to a hydroxyl group, and wherein formula (4) is:

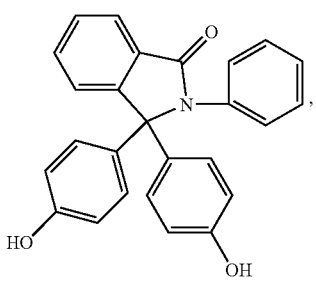
(4)

wherein the polycarbonate composition has
- a UL94 rating of V0 at a thickness of 1.5 millimeters;
- a melt viscosity rate (MVR) greater than or equal to 10 milliliters per 10 minutes when determined using ISO 1133 at 300° C. and 1.2 kilograms;
- a chlorine content of less than or equal to 100 parts by weight per million parts by weight of the polycarbonate composition; and
- a bromine content of less than or equal to 100 parts by weight per million parts by weight of the polycarbonate composition; and wherein the article, as molded and free of any coating, has
- a scratch depth at 8 Newtons force of less than or equal to 20 micrometers; and wherein the article has a DE* value less than or equal to 2.0 relative to an L* value of 26.989, an a* value of 0.287 and a b* value of −0.771 as determined by ISO 7724.

27. The article of claim 26, wherein in which greater than or equal to 45 percent of the total number of R¹ groups are aromatic organic groups derived from one or more of the following monomers:

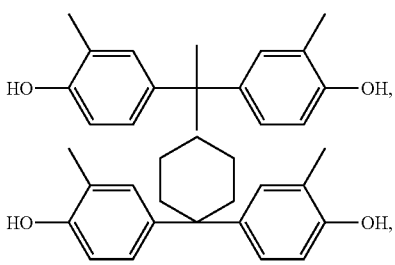

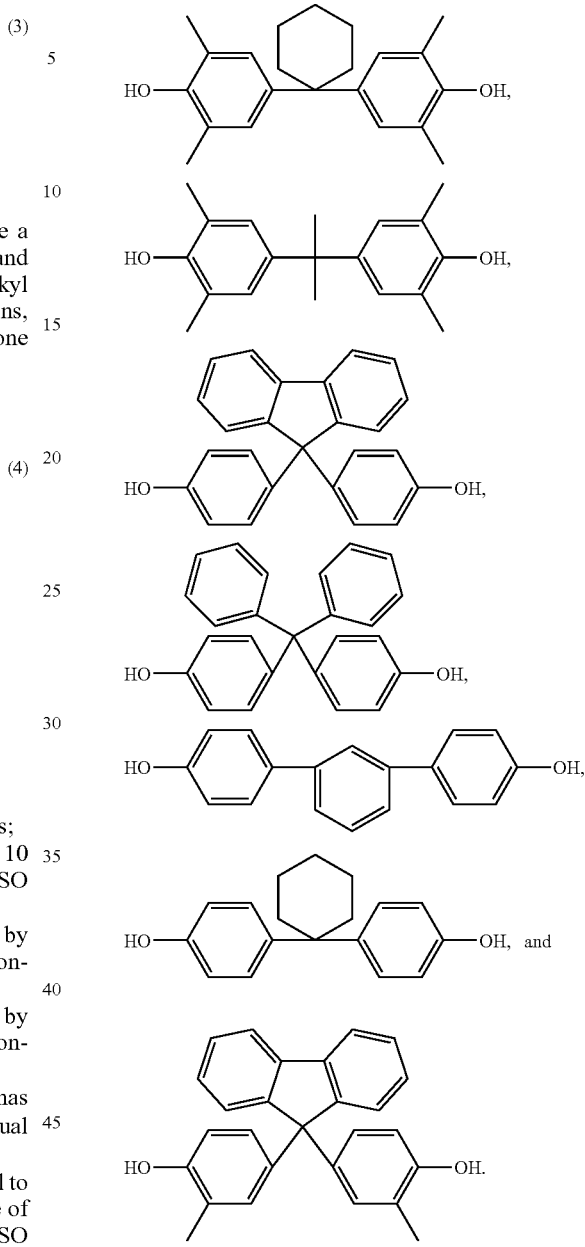

28. The article of claim 27, wherein the article is a bezel.

29. An injection molded article comprising a polycarbonate composition
wherein the polycarbonate composition comprises a colorant and a polycarbonate of formula (1)

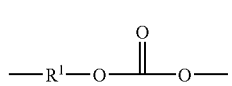
(1)

in which greater than or equal to 45 percent of the total number of R¹ groups are aromatic organic groups derived from a monomer of formula

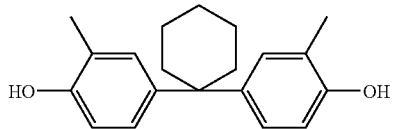

wherein the polycarbonate composition has
a UL94 rating of V0 at a thickness of 1.5 millimeters;
a melt viscosity rate (MVR) greater than or equal to 10 milliliters per 10 minutes when determined using ISO 1133 at 300° C. and 1.2 kilograms;
a chlorine content of less than or equal to 100 parts by weight per million parts by weight of the polycarbonate composition; and
a bromine content of less than or equal to 100 parts by weight per million parts by weight of the polycarbonate composition; and
wherein the article, as molded and free of any coating, has a scratch depth at 8 Newtons force of less than or equal to 20 micrometers; and
wherein the article has a DE* value less than or equal to 2.0 relative to an L* value of 26.989, an a* value of 0.287 and a b* value of −0.771 as determined by ISO 7724.

* * * * *